United States Patent [19]

Bax et al.

[11] 4,173,658
[45] Nov. 6, 1979

[54] POWDER COATING COMPOSITIONS

[75] Inventors: Hanns-Jörg Bax; Jörn Rüter; Roland Feinauer, all of Marl, Fed. Rep. of Germany

[73] Assignee: Chemische Werke Huels Aktiengesellschaft, Marl, Fed. Rep. of Germany

[21] Appl. No.: 920,085

[22] Filed: Jun. 28, 1978

Related U.S. Application Data

[63] Continuation of Ser. No. 776,817, Mar. 11, 1977, abandoned.

[30] Foreign Application Priority Data

Mar. 19, 1976 [DE] Fed. Rep. of Germany ....... 2611691

[51] Int. Cl.$^2$ .......................... B05D 3/02; B05D 1/24
[52] U.S. Cl. ..................... 427/27; 427/185; 427/195; 428/458; 428/480; 528/302
[58] Field of Search ....................... 427/185, 27, 195; 528/302; 428/458, 480

[56] References Cited

U.S. PATENT DOCUMENTS

| | | | |
|---|---|---|---|
| 2,901,466 | 8/1959 | Kibler et al. | 260/75 R |
| 2,961,365 | 11/1960 | Sroog | 260/75 R |
| 3,013,914 | 12/1961 | Willard | 260/75 R |
| 3,090,772 | 5/1963 | Crowell | 260/75 R |
| 3,232,813 | 2/1966 | Newton | 260/75 R |
| 3,505,293 | 4/1970 | Bond et al. | 260/75 R |
| 3,678,128 | 7/1972 | Riemhofer et al. | 260/75 R X |
| 3,763,109 | 10/1973 | Witsiepe | 260/75 R |
| 4,011,188 | 3/1977 | Ruter et al. | 427/27 X |
| 4,012,363 | 3/1977 | Bruning et al. | 427/195 X |
| 4,072,662 | 2/1978 | Linde et al. | 528/302 |

Primary Examiner—Shrive P. Beck
Attorney, Agent, or Firm—Millen & White

[57] ABSTRACT

Powder coating compositions, for coating metallic surfaces at high temperatures, comprising saturated, high-molecular thermoplastic copolyesters obtained by the condensation of terephthalic acid and other dicarboxylic acids with 1,4-butanediol and, optionally, other diols, and conventional auxiliary agents and additives.

10 Claims, No Drawings

POWDER COATING COMPOSITIONS

This is a continuation of application Ser. No. 776,817 filed Mar. 11, 1977, now abandoned.

BACKGROUND OF THE INVENTION

Powder coating compositions utilized to produce varnish-like coatings on metals are applied by fluidized bed coating, flame-spraying, or electrostatic powder coating. The coatings thus produced have good flow properties, good adhesion, and high resistance to impact stress.

The use of amorphous and/or partially crystalline thermoplastic copolyester powders in fluidized bed coating, flame-spraying, or electrostatic powder coating methods is conventional. However, under practical conditions, such powder coating compositions have several important disadvantages in addition to their good properties.

Exemplary coating compositions of amorphous thermoplastic copolyesters are described in British Pat. No. 1,029,136 and DAS German Published Application No. 1,222,205 (U.S. Pat. No. 2,901,466). The British patent discloses copolyesters of terephthalic acid, ethylene glycol, and neopentyl glycol, in which the diol neopentyl glycol is 30-50 molar percent of the glycol units.

DAS No. 1,222,205 teaches that, inter alia, polyesters of terephthalic acid and 1,4-dihydroxymethylcyclohexane modified with succinic acid or neopentyl glycol, are suitable for coatings. Coating compositions produced therefrom yield transparent, varnish-like coatings having good adhesion and high luster.

A serious disadvantage of these coatings is low impact resistance. This deficiency becomes apparent, in cases of thick coatings and mechanical stress, by crack formation and inadequate Erichsen and impact depression values. Furthermore, amorphous powder coating compositions tend to form lumps when stored somewhat above room temperature. The shelf life of amorphous coating compositions thus is considered insufficient.

Partially crystalline, thermoplastic copolyesters based on polyethylene terephthalate or polybutylene terephthalate, in contrast, yield powder coating compositions having satisfactory shelf stability. In accordance with British Pat. No. 676,372, copolyesters of ethylene glycol and an acid component of about 70 molar percent of terephthalic acid and about 30 molar percent of an aliphatic dicarboxylic acid can be used in coating compositions. Powder coating compositions based on copolyesters of terephthalic acid, isophthalic acid, ethylene glycol, and 1,3-propanediol are described in DOS(German Unexamined Laid-Open Application) No. 1,905,825.

Powder coating compositions of copolyesters of terephthalic acid and ethylene glycol, modified with 5 molar percent of 2,2-di-[(4-hydroxyethoxy)-phenyl]-propane are disclosed in DOS No. 2,124,808. Coatings produced from these polyester powders have high hardness, but poor adhesion and impact depression values. Adequate improvement of these properties is not attained by quenching with cold water.

DOS No. 2,346,559 discloses powder coating compositions of partially crystalline copolyesters of 1,4-butanediol and terephthalic acid, isophthalic acid and/or an aliphatic dicarboxylic acid. Coatings from these polyesters exhibit good adhesion, improved flexibility, and good Erichsen depression. However, sufficient impact depression cannot be obtained with coatings from these copolyester powders, as will be demonstrated below in Comparative Examples A and B.

It is an object of this invention to provide an impact-resistant, highly adherent, lustrous powder coating composition based on saturated, high-molecular thermoplastic polyesters.

SUMMARY OF THE INVENTION

This invention relates, in a powder polyester coating composition for coating of metallic surfaces at high temperatures whose polyester is a saturated, high-molecular thermoplastic copolyester obtained by condensation a functional derivative of a mixture of dicarboxylic acids comprising terephthalic acid with one or more diols including 1,4-butanediol, to the improvement wherein the acid portion of the polyester polymer units consists, in addition to those of terephthalic acid, of 10-60 molar percent of those of one or more cycloaliphatic dicarboxylic acids of up to 12 carbon atoms and 0-20 molar percent of those of one or more aliphatic dicarboxylic acid of 2-12 carbon atoms.

In another aspect, this invention relates, in a process for applying an impact resistant, highly adherent lustrous coating to a metal substrate by a fluidized bed, flame spraying or electrostatic powder coating method at a temperature of 200°-400° C., to the improvement of using as a coating composition the polyester composition described above.

DETAILED DESCRIPTION

The acid component of the polyester contains 10-60 molar percent of cycloaliphatic dicarboxylic acids of up to 12 carbon atoms and 0-20 molar percent of aliphatic dicarboxylic acids of 2-12 carbon atoms. Preferably, the polyester contains 20-50 molar percent of cycloaliphatic dicarboxylic acids and 0-10 molar percent of aliphatic dicarboxylic acids.

Suitable cycloaliphatic dicarboxylic acids are hexahydrophthalic acid, hexahydroterephthalic acid and hexahydroisophthalic acid. Hexahydroterephthalic acid is preferred.

Aliphatic dicarboxylic acids of 2-12 carbon atoms in the carbon chain include, inter alia, dicarboxylic acids or their anhydrides, e.g., oxalic, malonic, succinic, glutaric, adipic, dodecanedioic, azelaic, sebacic, pimelic and suberic acid. Dodecanedioic, azelaic, and sebacic acids are preferred.

Ester-forming derivatives of the dicarboxylic acids can be used, if desired. These include the acid halides, the methyl, ethyl and phenyl esters.

Preferably, the diol component is exclusively 1,4-butanediol. However, up to 40 molar percent of 1,4-butanediol can be replaced by cycloaliphatic and/or aliphatic diols of 2-12 carbon atoms.

Suitable cycloaliphatic diols of up to 12 carbon atoms are, for example, 1,4-dihydroxymethylcyclohexane, 1,3-dihydroxymethylcyclohexane, 1,2-dihydroxymethylcyclohexane, cis- or trans- 1,4-cyclohexane-diol and bis(hydroxymethyl)tricyclo[$5.2.1.0^{2.6}$]decane. Examples of suitable aliphatic diols are ethylene glycol, 1,3-propanediol, 1,2-propanediol, neopentyl glycol, 1,6-hexanediol and 1,12-dodecanediol.

The process for preparing the copolyesters is conventional and can be analogous to the production of polyethylene terephthalate. The starting materials employed are, for example, dimethyl esters and diols. After adding a suitable catalyst, transesterification is conducted and then, after further heating under vacuum, polycondensation is carried out. These methods are described in Sorensen and Campbell, "Preparative Methods of Polymer Chemistry," Interscience Publishers, Inc., New York (1961): 111-127 and "Kunststoff-Handbuch" (Plastics Manual), 8 (Polyesters), Carl Hanser Verlag, Munich (1973): 697.

The copolyesters have a reduced specific viscosity of 0.5-1.2, preferably 0.7-1.0 dl./g. Reduced specific viscosity $\eta_{red}$ is determined using a 0.23% solution in a 60/40 mixture of phenol/1,1,2,2-tetrachloroethane at 25° C.

The powder coating compositions of this invention can contain customary auxiliary agents and additives, e.g. pigments, fillers, flow agents, stabilizers, nucleating agents, crosslinking agents, etc.

To prepare powder coating compositions of this invention, granulated copolyesters can be pulverized in a conventional manner at low temperatures using liquid nitrogen as the coolant. The granulated polyesters can also be mixed initially with auxiliary agents and additives by conventional methods. The mixture is then melted in an extruder and granulated. The thus-obtained granules are pulverized with low-temperature cooling, e.g., by liquid nitrogen.

Another method for mixing and preparing the powder is described in DOS's 2,253,361 and 2,335,876. The powders thus prepared can also be used as coating compositions.

The powder coating compositions of the present invention can be applied to metallic workpieces by fluidized bed coating, flame-spraying, or electrostatic coating methods. The melting temperatures for these processes are in the range of about 200°-400° C.

The coating compositions of this invention yield fluid coatings which, depending on the cooling procedure used, have a high luster or a matte finish and very good adhesion and high impact depression values.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

EXAMPLES

Determination of the Mechanical Properties (1) Erichsen depression, determined according to DIN No. 53,156, is a measure of deep drawability. The units for Erichson depression are mm.

(2) Impact depression is determined as follows: A sandblasted metal sheet 1 mm. in thickness, coated with the coating composition being evaluated, is deformed by means of 7.6 kg. falling weight with a conical tip. The impact depression is the height at which the weight falls without crack formation or detachment of the coating.

Application of the Coating Composition

Coatings on metal are produced in the examples by the fluidized bed coating process described in German Pat. No. 933,019. A sandblasted steel sheet 1 mm. thick is degreased with acetone and heated to 350° C. and dipped for 2 seconds into the fluidized bed. After the powder has melted, the thus-coated sheet is cooled in the air or quenched by cold water. The results are either matte-finish or highly lustrous coatings.

The examples denoted by letters are comparative examples of prior art coating compositions.

EXAMPLE 1

A partially crystalline copolyester containing 60 molar percent of terephthalic acid and 40 molar percent of hexahydroterephthalic acid, of the total amount of acid, and of 1,4-butanediol ($\eta_{red}$ is 0.78 dl./g.; Ubbelohde-viscometer) was mixed in a high-speed mixer with 1% N,N'-hexamethylenebis-(3,5-di-tert.-butyl-4-hydroxyphenylpropionic acid amide), as disclosed in U.S. Pat. No. 4,011,188. After extrusion at 190°-220° C. and granulation, the mixture was ground in an impact pulverizer mill under cooling with liquid nitrogen. The fraction having granules of 63-300$\mu$ (microns) was used for coating.

The coating, quenched with water, had the following properties:
Erichsen depression: >10 mm.
Impact depression: 300-400 mm./7.6 kg.

EXAMPLE 2

A partially crystalline copolyester based 60 molar percent of terephthalic acid, 30 molar percent of hexahydroterephathalic acid and 10 molar percent of dodecanedioic acid of the total acid proportion and 1,4-butanediol ($\eta_{red}$ is 0.96 dl./g.) was processed into a powder as indicated in Example 1, but without additives. The coating obtained with this composition had the following properties:
Erichsen depression: >10 mm.
Impact depression: >1,600 mm./7.6 kg.

EXAMPLE 3

A copolyester of the composition as set forth in Example 2 was combined in a high-speed mixer with a master-batch of 10% of titanium dioxide, 1% of N,N'-hexamethylene-bis(3,5-di-tert.-butyl-4-hydroxyphenylpropionic acid amide) and 0.5% of polyacrylate as flow agent. After extrusion, cold grinding, and screening, a coating was prepared as in Example 1. This coating had the following properties:
Erichsen depression: >10 mm.
Impact depression: >1,600 mm./716 kg.

EXAMPLE 4

A partially crystalline copolyester based on 70 molar percent of terephthalic acid and 30 molar percent of hexahydroterephthalic acid of the total amount of acid and 90 molar percent of 1,4-butanediol and 10 molar percent of 1,4-dihydroxymethylcyclohexane of the total quantity of diol ($\eta_{red}$ is 0.99 dl./g.) was processed to form a powder in accordance with Example 1. The resulting coating, after cooling in air, had the following properties:
Erichsen depression: >10 mm.
Impact depression: 800-1,000 mm./7.6 kg.

EXAMPLE A (DOS 2,045,914, EXAMPLE 3)

A partially crystalline copolyester of 70 molar percent of terephthalic acid and 30 molar percent of isophthalic acid of the total acid concentration and 1,4-butanediol ($\eta_{red}$ is 0.85 dl./g.) was processed into a powder as set forth in Example 1. A coating on metal, prepared as set forth in Example 1, had the following properties:

Erichsen depression: 10 mm.
Impact depression: <100 mm./7.6 kg.

EXAMPLE B (DOS 2,346,559, EXAMPLE 2)

A partially crystalline copolyester made up of 70 molar percent of terephthalic acid, 25 molar percent of isophthalic acid, and 5 molar percent of azelaic acid of the total acid concentration and of 1,4-butanediol units ($\eta_{red}$ is 0.9 dl./g.) was processed into a powder as described in Example 1. The coating prepared therefrom in accordance with Example 1 had the following properties:

Erichsen depression: >10 mm.
Impact depression: <100 mm./7.6 kg.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a powder polyester coating composition for coating of metallic surfaces at high temperatures whose polyester is a saturated, high-molecular thermoplastic co-polyester obtained by condensation of a functional derivative of a mixture of dicarboxylic acids with one or more diols at least 60 molar percent of which is 1,4-butanediol, the improvement wherein the acid portion of the polyester polymer units consists essentially of a mixture of three acids which are (a) terephthalic acid, (b) 10–60 molar percent of one or more cycloaliphatic dicarboxylic acids of up to 12 carbon atoms and (c) up to 20 molar percent of one or more aliphatic dicarboxylic acids of 2–12 carbon atoms, whereby high values of both Erichsen depression and impact depression are achieved in the finally applied coating.

2. The powder coating composition of claim 1, wherein the acid portion of the polyester contains 20–50 molar percent of a cycloaliphatic dicarboxylic acid.

3. The powder coating composition of claim 1, wherein the cycloaliphatic acid is hexahydroterephthalic acid.

4. The powder coating composition of claim 3, wherein the aliphatic dicarboxylic acid is dodecanedioic acid.

5. The powder coating composition of claim 1, wherein the diol portion contains up to 40 molar percent of a cycloaliphatic diol of up to 12 carbon atoms or an aliphatic diol of 2–12 carbon atoms other than 1,4-butanediol.

6. The powder coating composition of claim 5, wherein the cycloaliphatic diol is 1,4-dihydroxymethylcyclohexane.

7. The powder coating composition of claim 1, wherein the diacid portion contains 30 molar percent of hexahydroterephthalic acid and the diol portion contains 10 molar percent of 1,4-dihydroxymethylcyclohexane.

8. The powder coating composition of claim 1, wherein the polyester has a reduced specific viscosity ($\eta_{red}$ as a 0.23% solution in a 60/40 mixture of phenol/1,1,2,2-tetrachloroethylene at 25° C.) of 0.7–1.0 dl./g.

9. In a process for applying an impact resistant, highly adherent coating to a metal substrate by a fluidized bed, flame spraying or electrostatic coating method at a temperature of 200°–400° C., the improvement comprising using as a coating composition the polyester composition of claim 1.

10. A process according to claim 9 wherein the coating is applied to the metal substrate by dipping the coated substrate, heated above the melting point of the coating composition, into a fluidized bed of the coating composition.

* * * * *